(12) United States Patent
Lange et al.

(10) Patent No.: US 7,696,879 B2
(45) Date of Patent: Apr. 13, 2010

(54) ASCERTAINING PHYSICAL ROUTING OF CABLING INTERCONNECTS

(75) Inventors: Andrew Snowden Lange, Culver City, CA (US); Scott William Nelson, Paris (FR)

(73) Assignee: Alcatel Lucent, Paris (FR)

( * ) Notice: Subject to any disclaimer, the term of this patent is extended or adjusted under 35 U.S.C. 154(b) by 226 days.

(21) Appl. No.: 12/000,823

(22) Filed: Dec. 18, 2007

(65) Prior Publication Data

US 2009/0153321 A1   Jun. 18, 2009

(51) Int. Cl.
G08B 13/14 (2006.01)
(52) U.S. Cl. ............... 340/572.1; 340/539.1; 340/551; 340/552; 340/825.49; 324/326; 235/385; 235/492; 235/375
(58) Field of Classification Search ............... 340/551, 340/552, 572.1–572.9, 539.1, 825.49, 5.92; 324/323–329; 342/450; 235/385, 492
See application file for complete search history.

(56) References Cited

U.S. PATENT DOCUMENTS

| | | | | |
|---|---|---|---|---|
| 4,866,388 A * | 9/1989 | Cosman et al. ............. 324/326 |
| 4,873,533 A * | 10/1989 | Oike ........................ 343/744 |
| 5,106,175 A * | 4/1992 | Davis et al. ................ 385/100 |
| 5,819,859 A * | 10/1998 | Stump et al. ................ 175/26 |
| 6,049,279 A * | 4/2000 | Minarovic ............... 340/572.8 |
| 6,243,657 B1 * | 6/2001 | Tuck et al. ................... 702/150 |
| 6,337,627 B1 * | 1/2002 | Von Gutfeld et al. ..... 340/572.1 |
| 6,377,203 B1 * | 4/2002 | Doany ......................... 342/44 |
| 6,380,894 B1 * | 4/2002 | Boyd et al. ................. 342/450 |
| 6,483,427 B1 * | 11/2002 | Werb ........................ 340/10.1 |
| 6,556,942 B1 * | 4/2003 | Smith ........................ 702/150 |
| 6,850,161 B1 * | 2/2005 | Elliott et al. ............. 340/572.1 |
| 6,968,994 B1 | 11/2005 | Ashwood Smith |
| 7,323,991 B1 * | 1/2008 | Eckert et al. ............. 340/572.1 |
| 7,391,324 B1 * | 6/2008 | Pflugrath et al. ......... 340/572.1 |
| 2003/0109267 A1 | 6/2003 | Bulut |
| 2004/0102865 A1 * | 5/2004 | Heusermann et al. ....... 700/115 |
| 2006/0109131 A1 * | 5/2006 | Sen et al. ................. 340/572.8 |
| 2006/0244656 A1 * | 11/2006 | Lawrence et al. ....... 342/357.02 |
| 2007/0120684 A1 * | 5/2007 | Utaka et al. ............. 340/572.8 |
| 2008/0204235 A1 * | 8/2008 | Cook ...................... 340/572.1 |
| 2008/0252449 A1 * | 10/2008 | Colvero et al. .............. 340/540 |
| 2009/0037146 A1 * | 2/2009 | Trowbridge et al. ......... 702/184 |
| 2009/0139336 A1 * | 6/2009 | Trowbridge et al. ........... 73/622 |

\* cited by examiner

*Primary Examiner*—Davetta W Goins
*Assistant Examiner*—Hoi C Lau
(74) *Attorney, Agent, or Firm*—Kramer & Amado, P.C.

(57) ABSTRACT

In a communication network or networked system, cables that interconnect systems or parts of a system are provided with RFID tags embedded at periodic intervals along their lengths. A network of GPS-enabled RFID readers with triangulation capabilities enables the determination of the physical routing of cables within an area of interest. It also enables communication of the physical routing information to an operations support system for cable management.

20 Claims, 1 Drawing Sheet

ASCERTAINING PHYSICAL ROUTING OF CABLING INTERCONNECTS

FIELD OF THE INVENTION

The invention is directed to communication networks and in particular to a system and method for ascertaining the physical routing of cables interconnecting communication systems.

BACKGROUND OF THE INVENTION

Evolution of network technologies resulted in a world of interconnected networks where businesses and households are now amazingly close to each-other. The notion of "network" turns out to be central to our times: the Internet, LANs, WANs, enterprise networks, home networks, etc. are today interconnected over the World Wide Web, changing our lives and the way we do business. This evolution presents significant challenges to service and network providers, which attempt to serve their clients faster and better, by continuously enlarging and upgrading their networks with a view to serve a growing number of clients and to implement the latest advances in networking technologies.

Typically, the equipment is situated in an environmentally hardened enclosure, such as a cabinet, or in a central office (CO) or a point-of-presence office which is generally environmentally controlled. Because the cost of space in these environments is high, the equipment is commonly organized in the most compact manner that is practical. As a result, there is often a confusing collection of cabling running through the environment to interconnect the equipment within the respective location (office, cabinet, etc) both to other equipment within the location and to equipment outside of the location.

Network deployment and upgrading presents complex challenges to providers, one of which is managing interconnections between equipment of various size, make and functionality (also referred to here as systems) that make-up the network. To use an example provided on the HP website at http://www.hpl.hp.com/research/about/asset_tracking.html: "a single rack of servers might have 2,000 identical optical cables running into and out of it; it can take two people three days to connect just 500 of them." Therefore, it is important that specific cables are connected to specific places on the equipment.

Thus, techniques to ascertain the existing physical cabling connections between various systems within a certain location (e.g. a Central Office) are needed. These techniques would also apply to cabling connections of electronic systems in general, in situations where there are numerous systems to be interconnected at a particular installation site and there are a very large number of electrical or optical cables interconnecting them, such that there exists a very real possibility of incorrect connections and wherein determining the exact nature of the interconnection errors would be a very onerous and time consuming task. In addition, these techniques should be equally applicable to cables made of optical fiber or copper.

It is known to attach identifying tags to cabling; this may be as simple as attaching a paper tag with a tie-wrap or writing on a piece of tape that is adhered to the cable. However, physical tags may become separated from the cables and the labels may be rendered illegible. Further, locating a particular tag amongst a great many tagged cables in a crowded environment may be difficult.

It is also known to use unique connectors. The connectors may be affixed to multiple cables and have a geometry that allows insertion into only one type of device in one particular way. However, the connectors must be connected to the cables in the proper way. Further, designing and manufacturing unique connectors for a very large number of cables is difficult and relatively costly because each can only serve a particular function and production runs tend to be in relatively small numbers.

Radio Frequency Identification (RFID or RF-ID) technology, although nascent, is known for improving supply chain efficiency by facilitating tracking of goods. For example, RFID may displace the bar codes currently used to identify products. An RFID tag is a small, inexpensive circuitry chip which stores data such as a product's expiration date and Electronic Product Code (EPC). The circuitry is responsive to a particular RF signal transmitted by a reader to generate a corresponding signal including the stored data. The range of the corresponding signal is dependent on various factors, but may be effective up to ten meters.

For example, Hewlett Packard and Connectivity Technologies offer solutions in this area, particularly using RFID tags at the ends of cables and RFID readers at the connection ports of systems to read the tags to identify the endpoint of cables that are connected to the ports. The cable identification information is then sent to an Operation Support System (OSS) or Network Management System (NMS) that uses the information to determine the interconnection of the systems, which is made available to an operator, e.g. as a network map. However, this solution does not determine the physical layout of the cabling, which can be important for repairing or replacing faulty cables or to locate cables for various reasons, e.g. system relocation, site construction/maintenance, etc.

A system for locating the geographical position of network elements in a network has also been proposed, as described in the US patent application publication number 20030109267 (Bulut) filed on Jun. 12, 2003 and entitled "Network element locating system" This patent application describes equipping network equipment with locators and connecting into the network a position manager. The locators acquire location information for the respective equipment and store it as position data. The equipment transmits the position data to the position manager over the network on request, and the position manager provides the user with the location of the equipment. However, this solution is mostly concerned with locating the equipment in case of faults and does not address the problem of determining the physical layout of the cabling.

Therefore, it would be desirable to have a solution to determine the physical routing of cables interconnecting communications systems for various purposes including repair or replacement of faulty cables, relocation of the communications systems, and maintenance or reconstruction of the immediate environment of the cables or the communication systems

SUMMARY OF THE INVENTION

It is an object of the invention to provide a system and method for determining the physical routing of cables interconnecting systems of a communications network.

According to an aspect of the invention there is provided a system for determining a physical routing of a cable for interconnecting communication systems. The system comprises: an RFID reader for reading information from RFID tags disposed at respective locations along the cable, the information including a cable identifier and a respective location identifier of a given RFID tag; a database for storing the information and a physical location of the RFID reader where the information from a given RFID tag was read; and a management system operable to access the database and for associating, for one or more RFID tags, the location of the RFID tag with the physical location of the RFID reader where the information from the RFID tag was read, thereby determining the physical routing of the cable.

In some embodiments of the invention the RFID reader comprises: a plurality of antennae, two or more of which are for receiving a signal from an RFID tag conveying said information; and, the management system comprises: means for estimating a distance to the RFID tag from a given antenna based on a strength of the signal received at the antenna; and means for adjusting the determination of the physical routing of the cable at the location of the RFID tag according to the estimated distances.

Advantageously, the management system further comprises means for determining a physical layout of a cabling plant from a plurality of determinations of physical routing of cables in the cabling plant.

According to another aspect of the invention there is provided a method of determining a physical routing of a cable for interconnecting communications systems. The method comprises: reading information from RFID tags disposed at respective locations along the cable, the information including a cable identifier and a respective location identifier of a given RFID tag; determining, for the information read from one or more RFID tags, a physical location of an RFID reader that read the information; and associating, for one or more RFID tags, the location of the RFID tag with the physical location of the RFID reader that read the RFID tag, thereby determining the physical routing of the cable.

Some embodiments of the invention include receiving, at two or more antenna of an RFID reader having a plurality of antenna, a signal from an RFID tag conveying said information; estimating a distance to the RFID tag from a given antenna based on a strength of the signal received at the antenna; and adjusting the determination of the physical routing of the cable at the location of the RFID tag according to the estimated distances.

Advantageously, storing the determination of the physical routing of the cable in a management system enables the physical layout of a cabling plant comprising a plurality of cables to be determined.

Advantageously, embodiments of the invention could be used by network and service providers to troubleshoot cabling interconnection problems of communications equipment, both electrical and optical interconnections, as well as other types of electronic systems in general. Important reductions in the time needed to troubleshoot cablings errors may be obtained by addressing the problem of easily and accurately determining the physical routing of cables, e.g. of interconnection systems in a Telco's CO.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
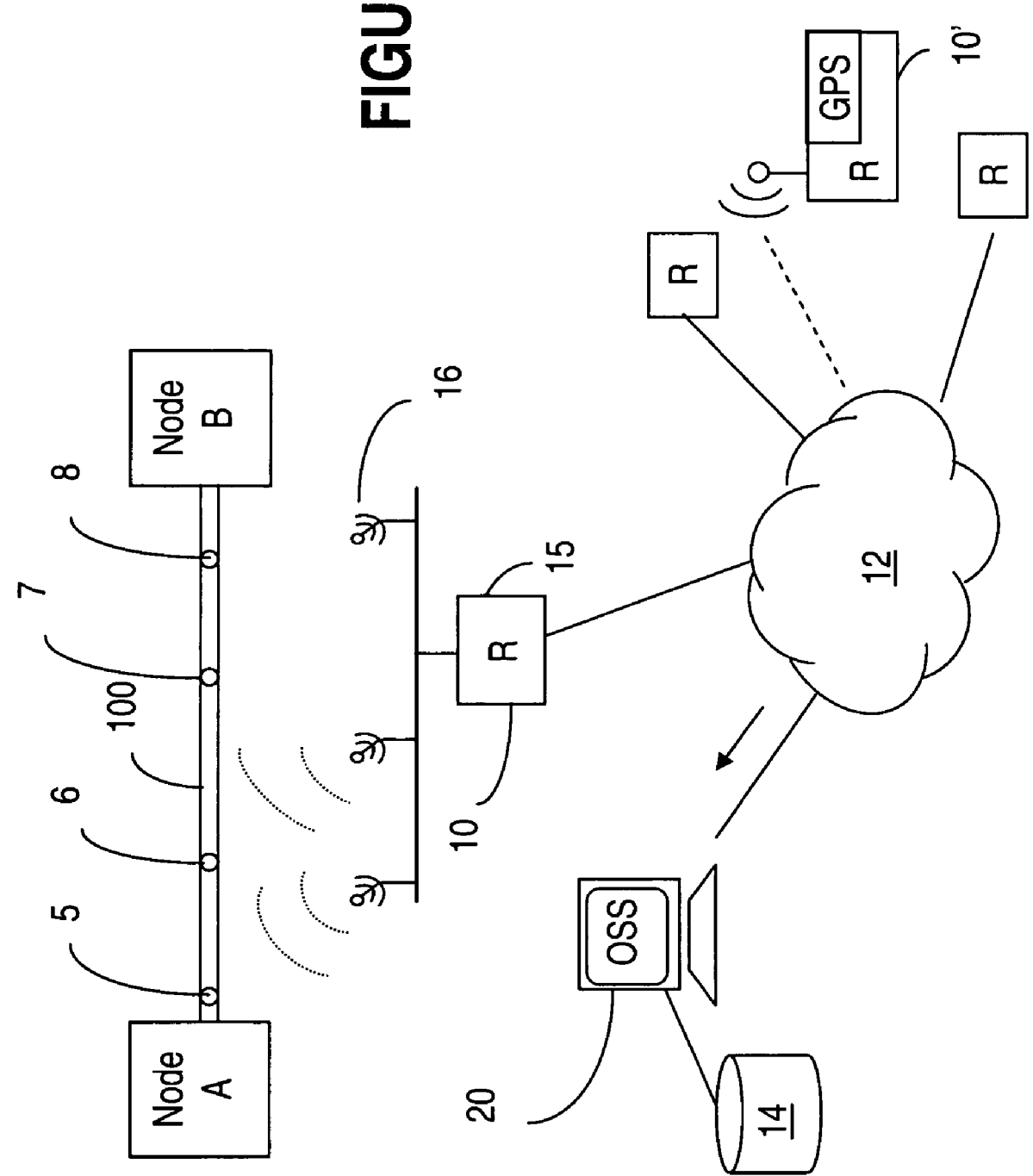
FIG. 1 illustrates a system for determining the physical routing of cables according to an embodiment of the invention.

Referring to FIG. 1, a network of RFID readers is created for determining the physical layout of a cable plant and for communicating the corresponding layout information to a management system for cable management.

FIG. 1 illustrates tracing the physical routing of a cable 100 interconnecting two nodes, referred to as node A and node B. To this end, a cable 100 is equipped with RFID tags 5, 6, 7, 8 which are placed along it at periodic intervals. Information stored in each RFID tag would include, for example, a unique cable identifier and location of the RFID tag in the cable. The location of the RFID tag could be expressed as distance in meters from one end of the cable, or as a sequence number with respect to the sequence number of an adjacent RFID tag. In the case of the latter the RFID tags would be disposed at known equidistant, or periodic, intervals along the cable 100. A network 12 of remotely readable RFID readers 10-10' collects cable routing information and communicates that information to an operational support system (OSS) 20 or network management system also referred to collectively as a management system.

The RFID readers 10 are capable of reading the RFID tags 5, 6, 7, 8 placed along the cable 100 that runs nearby and providing this information to the central location. Additionally, one or more of the RFID readers, for example RFID reader 10', could have geographically awareness such as geographical positioning system (GPS) based locator shown by the GPS unit 15. This would be especially useful for a handheld RFID reader 10' that communicated wirelessly to the OSS 20 while being passed along a cabling conduit or trench. In this case the physical location of the RFID reader 10' would be determined where an RFID tag is read by using the GPS unit 15. A geographic reading taken from the GPS unit 15 would be correlated to a specific position in a cabling conduit, or a cabling trench. Alternatively, an RFID reader 10 could have a fixed location, its position manually configured in the OSS 20. Triangulation functionality, including antennae 16, may be present in one or more of the RFID readers 10. The RFID readers 10, 10' gather information from RFID tags 5, 6, 7, 8 located at various points along the cable 100, typically at periodic intervals. The RFID tags 5, 6, 7, 8 could be embedded in, or attached to, the cable 100. The location of RFID readers 10, 10' and their corresponding gathered information from RFID tags 5, 6, 7, 8 is used to determine the physical routing of the cable 100. By providing this cable proximity information to the OSS 20, determination of physical layout of a cabling plant, comprising multiple cables, is possible within a given margin of error. Decreasing the periodic interval between RFID tags 5, 6, 7, 8 and/or decreasing the spacing between RFID readers 10 or antennae 16 could be instrumental in reducing the margin of error. The capability of determining the physical layout of cabling would be beneficial in many scenarios such as system relocation and site construction/maintenance activities, which would otherwise require manual verification of cable placements or reliance on installation plans or building schematics.

The OSS 20 includes functionality for RFID based cable management. More specifically, the OSS 20 maintains a database 14 keyed off of the RFID tags. The database includes the physical location information of the RFID readers 10, 10' and information from the RFID tags 5, 6, 7, 8. The OSS 20 accesses the database and associates, for one or more RFID tags 5, 6, 7, 8, the location of the RFID tag with the physical location of the RFID reader 10, 10' where the information from the RFID tag was read, thereby determining the physical routing of the cable 100. As well, the OSS 20 may be integrated with other OSSs, such as those for the nodes A, B interconnected by the cable 100. The physical routing information of the physical layout of cabling may for example include, for each cable 100 of interest, a cable identification code (ID), the distances between RFID tags, identification of any cabling channel such as a conduit or trench through which the cable is routed, additional user-supplied information, etc. Preferably, the physical routing information also includes equipment types and ports that a given cable connects. Information on where the RFID readers 10 are located facilitates automatic mapping of a cable plant.

The physical location of routed cables is determined based on the physical location of the RFID readers. This information is recorded in the database 14 by an operator at the time when network 12 is deployed (provisioning), or is automatically entered in the database 14 based on the aforementioned GPS-based functionality (geographic information). The physical location information of the RFID readers may for example include conduit/trench identification information and the position of the closest inspection point along the cable.

Triangulation functionality would include multiple separate antennas 16 on one or more RFID readers 10. Distances to an RFID tag from various antennas 16 could be estimated from the relative strength of the signal received from the RFID tag at each of the antenna 16. A more accurate determination of the physical location of the RFID tag could be made using triangulation techniques and the estimated distances as compared to a reading from a single RFID reader. Accordingly, if this technique were applied to several RFID tags, a more accurate determination of the physical routing of a cable could be made.

Numerous modifications, variations and adaptations may be made to the embodiment of the invention described above without departing from the scope of the invention, which is defined in the claims.

What is claimed is:

1. A method of determining a physical routing of a cable for interconnecting communications systems through a conduit, comprising:
    reading, with a plurality of RFID readers, information from a plurality of RFID tags disposed at respective locations along the cable, the information including a cable identifier and a respective location identifier of a given RFID tag;
    determining, for the information read from each RFID tag, a physical location of each RFID reader that read the information based on physical location information of the RFID readers, wherein the physical location information comprises a conduit identification and a position of a closest inspection point along the cable; and
    associating, for each RFID tag, the location of the RFID tag with the physical location of each RFID reader that read the RFID tag, thereby determining the physical routing of the cable.

2. The method of claim 1, wherein at least one location identifier specifies a distance from one end of the cable.

3. The method of claim 2, wherein a plurality of the respective locations of the plurality of RFID tags are at periodic intervals along the cable.

4. The method of claim 1, wherein at least one physical location of one of the plurality of RFID readers is fixed and determined from manually configured information.

5. The method of claim 1, wherein at least one physical location of one of the plurality of RFID readers is variable and is determined where the RFID tag was read.

6. The method of claim 5, wherein the determination is made using a GPS unit.

7. The method of claim 3, wherein at least one physical location of one of the plurality of RFID readers corresponds to a cabling channel and a specific position therein.

8. The method of claim 1, wherein at least one location identifier specifies a sequence number with respect to an adjacent RFID tag.

9. The method of claim 1, further comprising:
    receiving, at a plurality of antennae of each RFID reader a signal from each RFID tag conveying said information;
    estimating a distance to a particular RFID tag from a given antenna based on a strength of the signal received at the given antenna; and
    adjusting the determination of the physical routing of the cable at the location of the particular RFID tag according to the estimated distances.

10. The method of claim 1, further comprising
    storing the determination of the physical routing of the cable in a management system for determining the physical layout of a cabling plant.

11. The method of claim 1, wherein the information includes an indication of one or more of equipment types and ports that a given cable connects.

12. A system that determines a physical routing of a cable through a conduit for interconnecting communication systems, comprising:
    a plurality RFID readers that receive information from a plurality of RFID tags disposed at respective locations along the cable, the information including a cable identifier and a respective location identifier of a given RFID tag;
    a database that stores the information and a physical location of the RFID reader where the information from a given RFID tag was read; and
    a management system that accesses the database and associates, for each RFID tag, the location of the RFID tag with the physical location of each RFID reader where the information from the RFID tag was read, thereby determining the physical routing of the cable based on physical location information of the RFID readers, wherein the physical location information comprises a conduit identification and a position of a closest inspection point along the cable.

13. The system of claim 12, wherein at least one location identifier corresponds to a predetermined distance from one end of the cable.

14. The system of claim 12, wherein at least one location identifier specifies a sequence number with respect to an adjacent RFID tag.

15. The system of claim 13, wherein at least one physical location of one of the plurality of RFID readers is variable and is determined where the RFID tag was read.

16. The system of claim 15, wherein the determination is made using a geographical positioning system unit.

17. The system of claim 15, wherein at least one physical location of one of the plurality of RFID readers corresponds to a cabling channel and a specific position therein.

18. The system of claim 12, wherein each RFID reader comprises:
    a plurality of antennae, two or more of which are for receiving a signal from each RFID tag conveying said information; and, the management system comprises:
    means for estimating a distance to a particular RFID tag from a given antenna based on a strength of the signal received at the given antenna; and
    means for adjusting the determination of the physical routing of the cable at the location of the particular RFID tag according to the estimated distances.

19. The system of claim 12, wherein the management system further comprises means for determining a physical layout of a cabling plant from a plurality of determinations of physical routing of cables in the cabling plant.

20. The system of claim 12, wherein the information includes an indication of one or more of equipment types and ports that a given cable connects.

* * * * *